United States Patent
Goldstein et al.

(10) Patent No.: US 12,101,856 B2
(45) Date of Patent: Sep. 24, 2024

(54) SYSTEMS AND METHODS FOR COLOR TARGETING FOR ACCURATE WHITE COLORS AND SATURATED COLORS

(71) Applicant: SIGNIFY HOLDING B.V., Eindhoven (NL)

(72) Inventors: Peter Isaac Goldstein, Woburn, MA (US); James William Preston, Westford, MA (US); Hong Zhang, Lexington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/913,913

(22) PCT Filed: Mar. 18, 2021

(86) PCT No.: PCT/EP2021/056991
§ 371 (c)(1),
(2) Date: Sep. 23, 2022

(87) PCT Pub. No.: WO2021/191049
PCT Pub. Date: Sep. 30, 2021

(65) Prior Publication Data
US 2024/0215128 A1    Jun. 27, 2024

Related U.S. Application Data

(60) Provisional application No. 63/000,689, filed on Mar. 27, 2020.

(30) Foreign Application Priority Data

Apr. 16, 2020    (EP) .................................... 20169745

(51) Int. Cl.
H05B 45/20    (2020.01)
(52) U.S. Cl.
CPC ................................... H05B 45/20 (2020.01)
(58) Field of Classification Search
None
See application file for complete search history.

(56) References Cited

U.S. PATENT DOCUMENTS

| 9,253,855 B2 | 2/2016 | Van Kaathoven et al. |
| 2007/0110301 A1 | 5/2007 | Wu et al. |

(Continued)

FOREIGN PATENT DOCUMENTS

| EP | 2950618 A1 | 12/2015 |
| EP | 3255875 A1 | 12/2017 |
| WO | 2018198062 A1 | 11/2018 |

*Primary Examiner* — Anh Q Tran

(57) ABSTRACT

A method of driving a plurality of LED-based light sources to provide accurate white points and saturated color points. The method includes receiving or setting a selectable target chromaticity; determining that the selectable target chromaticity is between two vertices of the global common gamut; defining an inner region within the global common gamut; calculating a first directed distance between the selectable target chromaticity and the transition boundary of the inner region and a second directed distance between the selectable target chromaticity and a straight side of the global common gamut; and modifying the selectable target chromaticity to a modified target chromaticity within a light fixture gamut based at least in part on the calculated first and second directed distances; or generating an activation signal for driving the plurality of light sources based on the selectable target chromaticity based at least in part on the calculated first and second directed distances.

14 Claims, 22 Drawing Sheets

(56) References Cited

U.S. PATENT DOCUMENTS

| | | |
|---|---|---|
| 2015/0257241 A1 | 9/2015 | Krause |
| 2015/0296589 A1 | 10/2015 | Melanson et al. |
| 2015/0342002 A1* | 11/2015 | Jørgensen .............. H05B 45/20 |
| | | 315/297 |
| 2017/0111551 A1 | 4/2017 | Morovic et al. |
| 2017/0359490 A1* | 12/2017 | Mazzante ................. G06T 7/90 |

* cited by examiner

SYSTEMS AND METHODS FOR COLOR TARGETING FOR ACCURATE WHITE COLORS AND SATURATED COLORS

CROSS-REFERENCE TO PRIOR APPLICATIONS

This application is the U.S. National Phase application under 35 U.S.C. § 371 of International Application No. PCT/EP2021/056991, filed on Mar. 18, 2021, which claims the benefit of U.S. Provisional Application No. 63/000,689, filed on Mar. 27, 2020 and European Patent Application No. 20169745.5, filed on Apr. 16, 2020. These applications are hereby incorporated by reference herein.

FIELD OF THE DISCLOSURE

The present disclosure is directed generally to lighting systems and methods for color targeting for accurate white/pastel points and saturated colors using light-emitting diodes (LEDs) without requiring a user to change settings or reconfigure the lighting installation.

BACKGROUND

LED lighting products can only produce colors within their own actual gamut. Due to manufacturing variation inherent in LED technology, no two LEDs are exactly alike. The color differences can be noticeable, especially between different products and LED manufacturers. As a result, no two LED lights produce exactly the same gamut of colors. For example, two LED lights can produce a particular color point representing white light, but they would produce the color point in a different way because they have different color gamuts.

Despite these differences, it is desirable to be able to specify exact colors of light, especially white light. One typical solution to this problem involves restricting all LED products to a small color gamut that is common to all of them. This is beneficial because it standardizes the way that color points are communicated to the products. Using a small common color gamut enables different LED fixtures to target colors within the small common color gamut precisely. Unfortunately, as the number of LED products increases in lighting systems, the size of the color gamut that is common to all of the products decreases. The small size of a common color gamut means that the products can only produce white and pastel colors, but not saturated colors. Thus, while different LED fixtures can precisely target colors within the small common color gamut, they lose the ability to produce saturated colors located at the exteriors of their gamuts. Other solutions sacrifice on consistency between LED fixtures for the widest possible color gamut (i.e., the most saturated colors). Switching between providing accurate white points to providing fully saturated colors requires changing settings or reconfiguring an LED lighting installation.

Accordingly, there is a need in the art for LED lighting systems and methods configured to provide accurate white points and saturated colors without having to change settings or reconfigure the lighting installation. The systems and methods described herein also exhibit consistent behavior with respect to DMX values and temperature changes.

SUMMARY OF THE INVENTION

The present disclosure is directed to inventive systems and methods for controlling one or more LED lighting products to provide accurate white/pastel color points and saturated color points without requiring settings to be changed or reconfiguration of a lighting installation. Systems disclosed herein include at least one lighting product including a plurality of light sources, preferably, LED-based light sources. The systems further include a controller configured to designate a central portion of an operating gamut as an accurate region for targeting white/pastel colors accurately and the outer portions of the operating gamut as a saturated region for targeting saturated colors. The controller is further configured to blend between the central portion and the outer portions based on the color point requested by the user.

Generally, in one aspect a method of driving a plurality of LED-based light sources at a selectable target chromaticity in a color space is provided. The method includes receiving or setting the selectable target chromaticity within a global common gamut of the color space; determining that the selectable target chromaticity is between two adjacent vertices of a first plurality of vertices of the global common gamut; defining, with a transition boundary, an inner region within the global common gamut; and calculating a first directed distance between the selectable target chromaticity and the transition boundary of the inner region and a second directed distance between the selectable target chromaticity and a straight side of the global common gamut between the two adjacent vertices. The method further includes modifying the selectable target chromaticity to a modified target chromaticity within a light fixture gamut based at least in part on the calculated first and second directed distances or generating an activation signal for driving the plurality of LED-based light sources based on the selectable target chromaticity based at least in part on the calculated first and second directed distances.

In example embodiments, the method further includes calculating the light fixture gamut where the light fixture gamut at least partially encloses the global common gamut, and the step of calculating the light fixture gamut includes determining or receiving colorimetric data indicative of colorimetric properties of light emitted by the plurality of LED-based light sources, wherein the colorimetric properties define the light fixture gamut.

In example embodiments, the light fixture gamut fully encloses the global common gamut.

In example embodiments, the step of defining the inner region includes defining a global gamut center by calculating an average of chromaticity values for color points at the first plurality of vertices of the global common gamut; extending a line between the global gamut center and each of the first plurality of vertices of the global common gamut; and positioning a second plurality of vertices such that each vertex of the second plurality of vertices intersects one of the lines extending between the global gamut center and each of the first plurality of vertices and the transition boundary connects the second plurality of vertices.

In example embodiments, the step of defining the inner region includes defining a global gamut center by calculating an average of chromaticity values for color points at the first plurality of vertices of the global common gamut; positioning a second plurality of vertices such that each vertex of the second plurality of vertices is between the global gamut center and a respective vertex of the first plurality of vertices; and connecting the transition boundary between the second plurality of vertices; wherein the first and second plurality of vertices are not collinear with the global gamut center.

In example embodiments, the step of determining that the selectable target chromaticity is between two adjacent vertices of the first plurality of vertices of the global common gamut includes defining a global gamut center by calculating an average of chromaticity values for color points at the first plurality of vertices of the global common gamut; extending a line between the global gamut center and each of the first plurality of vertices of the global common gamut; and determining that the selectable target chromaticity is between two adjacent lines extending between the global gamut center and the first plurality of vertices of the global common gamut by calculating third and fourth directed distances between the selectable target chromaticity and the lines extending between the global gamut center and the two adjacent vertices of the of the global common gamut.

In example embodiments, the step of calculating the first and second directed distances includes defining a global gamut center by calculating an average of chromaticity values for color points at the first plurality of vertices of the global common gamut; extending a line between the global gamut center and the selectable target chromaticity; projecting the line onto the global common gamut; and calculating the first directed distance between the selectable target chromaticity and a first point where the line intersects the transition boundary of the inner region and the second directed distance between the selectable target chromaticity and a second point where the line intersects the straight side of the global common gamut between the two adjacent vertices.

In example embodiments, the method further includes determining not to modify the selectable target chromaticity when the selectable target chromaticity is within the inner region.

In example embodiments, the method further includes determining to modify the selectable target chromaticity when the selectable target chromaticity is outward of the inner region.

In example embodiments, the method further includes modifying the selectable target chromaticity to the modified target chromaticity within the light fixture gamut and outside the global common gamut based at least in part on a relationship between the calculated first and second directed distances.

In example embodiments, the method further includes calculating the light fixture gamut where the light fixture gamut at least partially encloses the global common gamut and the light fixture gamut comprises a third plurality of vertices; and modifying a first color space area to a second color space area, where the first color space area is defined by the straight side of the global common gamut, the transition boundary of the inner region and lines extending between endpoints of the straight side and the transition boundary and the second color space area is defined by the transition boundary of the inner region and two adjacent vertices of the third plurality of vertices of the light fixture gamut.

Generally, in another aspect, a system is provided. The system includes a plurality of LED-based light sources configured to generate light defined by a light fixture gamut within a color space; and a controller. The controller is configured to: receive or set a selectable target chromaticity within a global common gamut of the color space; determine that the selectable target chromaticity is between two adjacent vertices of a first plurality of vertices of the global common gamut; define, with a transition boundary, an inner region within the global common gamut; and calculate a first directed distance between the selectable target chromaticity and the transition boundary of the inner region and a second directed distance between the selectable target chromaticity and a straight side of the global common gamut between the two adjacent vertices. The controller is further configured to modify the selectable target chromaticity to a modified target chromaticity within the light fixture gamut based at least in part on the calculated first and second distances or generate an activation signal for driving the plurality of LED-based light sources based on the selectable target chromaticity based at least in part on the calculated first and second directed distances.

In example embodiments, the controller is further configured to generate another activation signal for driving the plurality of LED-based light sources based on the modified target chromaticity.

In example embodiments, the light fixture gamut at least partially encloses the global common gamut and the light fixture gamut is defined by colorimetric properties of light emitted by the plurality of LED-based light sources.

In example embodiments, the modified target chromaticity is outside the global common gamut.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the present disclosure.

DETAILED DESCRIPTION OF EMBODIMENTS

The present disclosure describes various embodiments of systems and methods for controlling one or more LED-based lighting products to provide accurate white/pastel color points and saturated color points without requiring settings to be changed or reconfiguration of a lighting installation. Applicants have recognized and appreciated that it would be beneficial to provide accurate shades of white and fully saturated colors within the same system with no reconfiguration required. A particular goal of utilization of certain embodiments of the present disclosure is to define an inner region of an operating gamut to target white/pastel colors accurately while maintaining access to the entire gamut of the lighting fixture to provide saturated colors as well.

Figure 1:
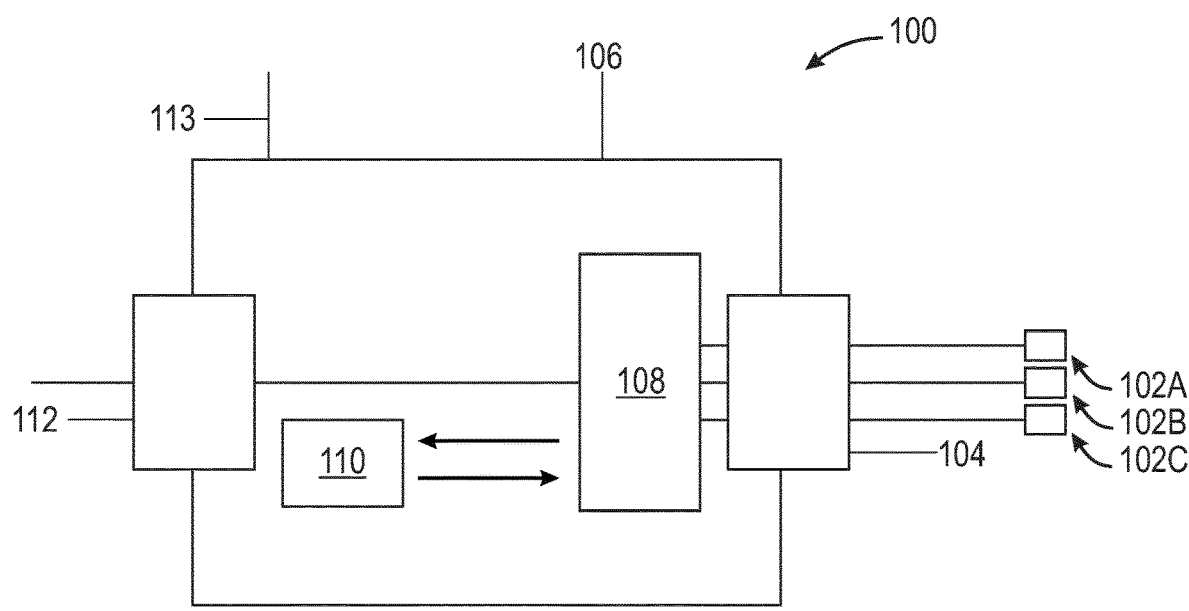
FIG. 1 illustrates a schematic block diagram depicting a color lighting system according to the present disclosure.

Referring to FIG. 1, a schematic block diagram depicting a color lighting system 100 according to the present disclosure is illustrated including light-sources 102A-C. Light sources 102A-C are three narrow-banded, essentially monocolor light-sources, for example, red, green, and blue light sources. Color lighting system 100 also includes a light source interface 104, a controller 106 including a microprocessor 108, a memory 110, and an external interface 112. Color lighting system 100 can be powered via an external power connection 113 or an internal power supply, such as a battery, can be used. Light sources 102A-C shown in FIG. 1 can be mounted in a single lighting fixture. However, it should be appreciated that any number of light sources and corresponding light fixtures can be included in color lighting system 100. Microprocessor 108 of controller 106 is configured to receive a request for a selectable target chromaticity via external interface 112 and, following processing, outputs one or more control signals to drive light sources 102A-C via the light source interface 104. Light sources 102A-C are intensity controllable (dimmable) and may be controlled to output light of their respective colors at relative intensities from 0-100%.

Figure 2:
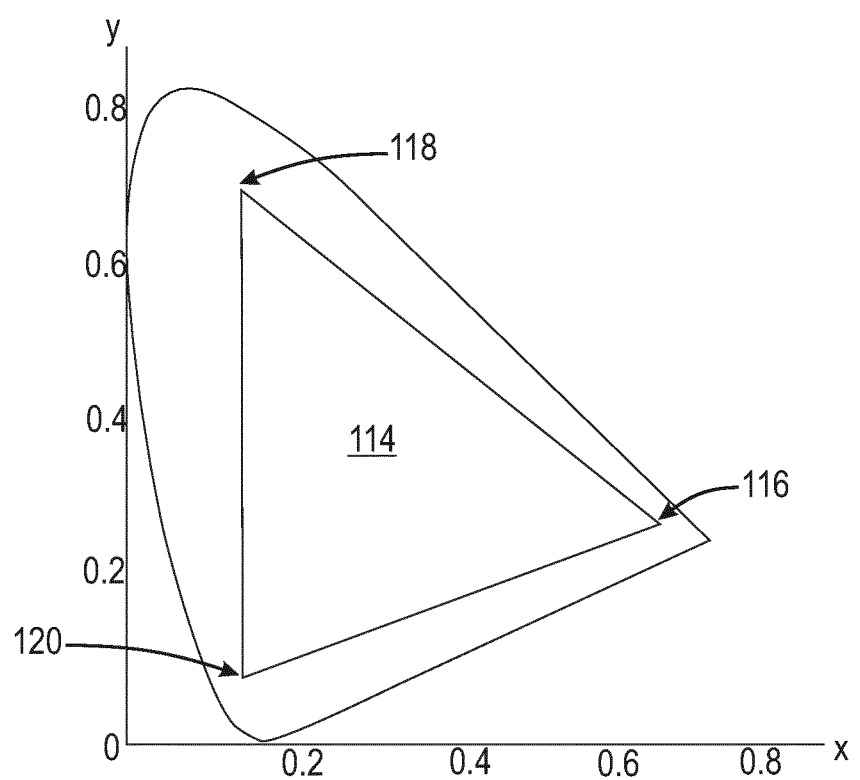
FIG. 2 illustrates a CIE chromaticity diagram including a single unique lighting fixture gamut according to the present disclosure.

Although FIG. 1 shows red, blue, and green light sources 102A-C, it should be appreciated that any source colors can be used. Additionally, it should be appreciated that any suitable number of light sources can be used, for example, additional or fewer light sources can be used. To illustrate the color generation capability of a lighting fixture including light sources 102A-C, FIG. 2 shows a CIE chromaticity diagram, or a color space or a color system, including a triangular lighting fixture gamut 114. In alternate embodiments, the lighting fixture gamut can have different shapes (e.g., polygonal shapes). The lighting fixture including light sources 102A-C is configured to generate and mix red light, green light, and blue light in various combinations and proportions to create different temperatures of light. The light emitted by each light source exhibits unique colorimetric properties and these colorimetric properties can be mapped to a corresponding point 116, 118, and 120 with x and y chromaticity coordinates on the CIE chromaticity diagram. The x and y chromaticity coordinates 116, 118, and 120 of light sources 102A-C define a unique gamut of the lighting fixture. The lighting fixture gamut 114 specifies all of the possible colors (or color temperatures) that may be generated by the lighting fixture via additive mixing. The x and y chromaticity coordinates depend only on hue and saturation, and are independent of the amount of luminous energy. While the x and y chromaticity coordinates near the boundaries of the lighting fixture gamut 114 are more saturated, as one moves from the boundaries toward a center point of the lighting fixture gamut 114 the colors become less saturated.

Figure 3:
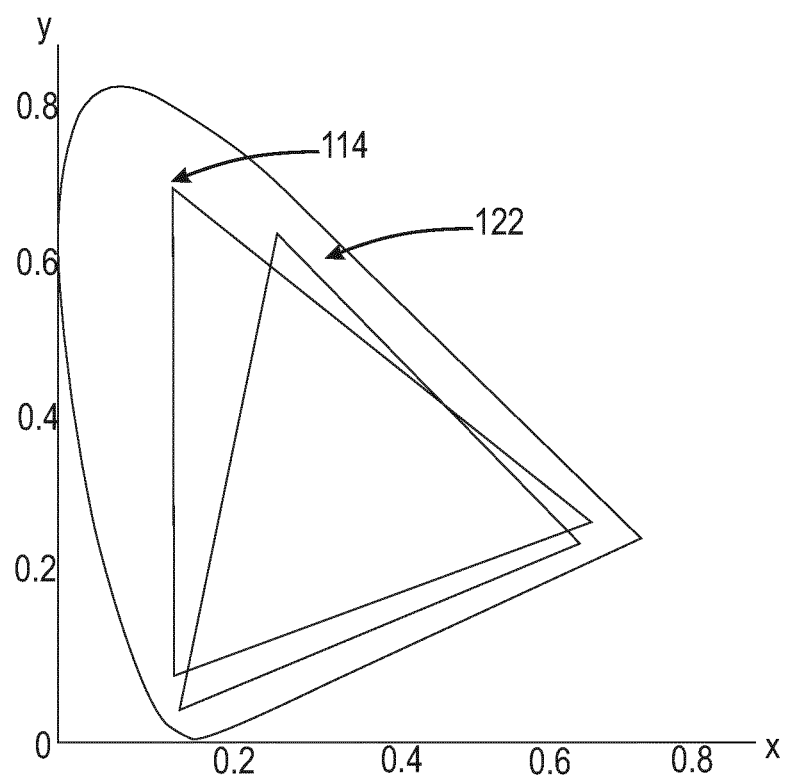
FIG. 3 illustrates the CIE chromaticity diagram of FIG. 2 including two unique lighting fixture gamuts according to the present disclosure.

As discussed above, due to manufacturing variation inherent in LED technology, no two LEDs are exactly alike; thus, another lighting fixture including red, green, and blue light sources would have a different lighting fixture gamut. FIG. 3 shows the CIE chromaticity diagram of FIG. 2 including two unique lighting fixture gamuts 114 and 122.

Applicants have recognized and appreciated that multiple lighting units, each configured to generate variable color light or variable color temperature white light based on additive mixing of multiple light sources, may not be capable of generating substantially the same range of colors or color temperatures of light even though the lighting units employ generally similar light sources. If two or more such lighting units receive instructions (e.g. lighting commands) intended to cause the generation of the same color (or color temperature) of light from multiple units, each lighting unit may in fact generate a perceivably different color (or color temperature) of light, based at least in part on their respective different gamuts (e.g., as determined by the different chromaticity coordinates of their respective "same color" sources). If two or more such lighting units are deployed together, for example, as components of a lighting system (e.g., to provide general purpose illumination or other types of lighting in tandem in a given environment), inconsistent, unpredictable, and generally undesirable artifacts may result in the generation of variable color light or variable color temperature white light.

Figure 4:
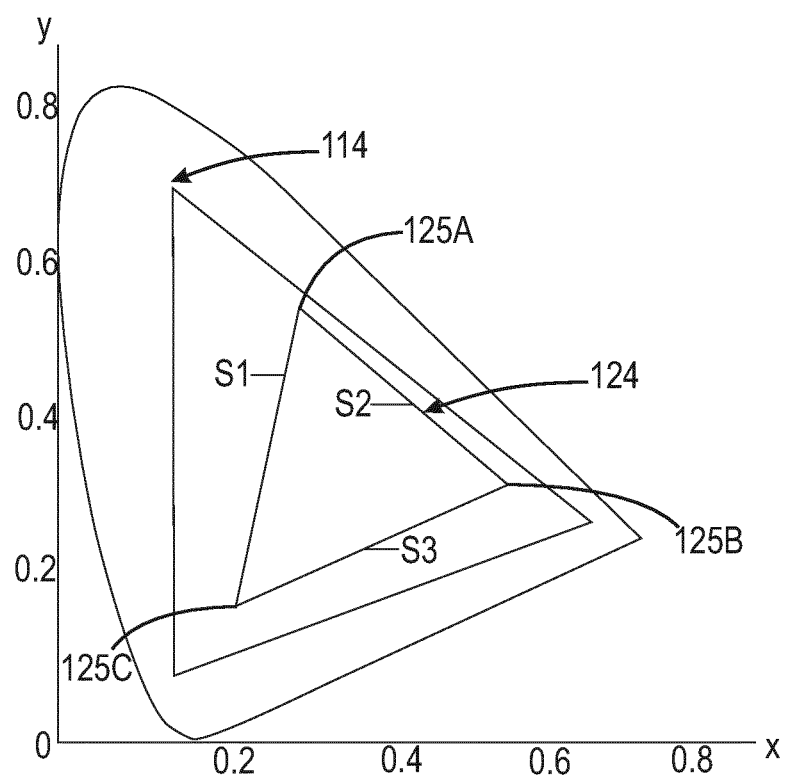
FIG. 4 illustrates a CIE chromaticity diagram including a unique lighting fixture gamut and a global common gamut within the lighting fixture gamut according to the present disclosure.
Figure 4A:
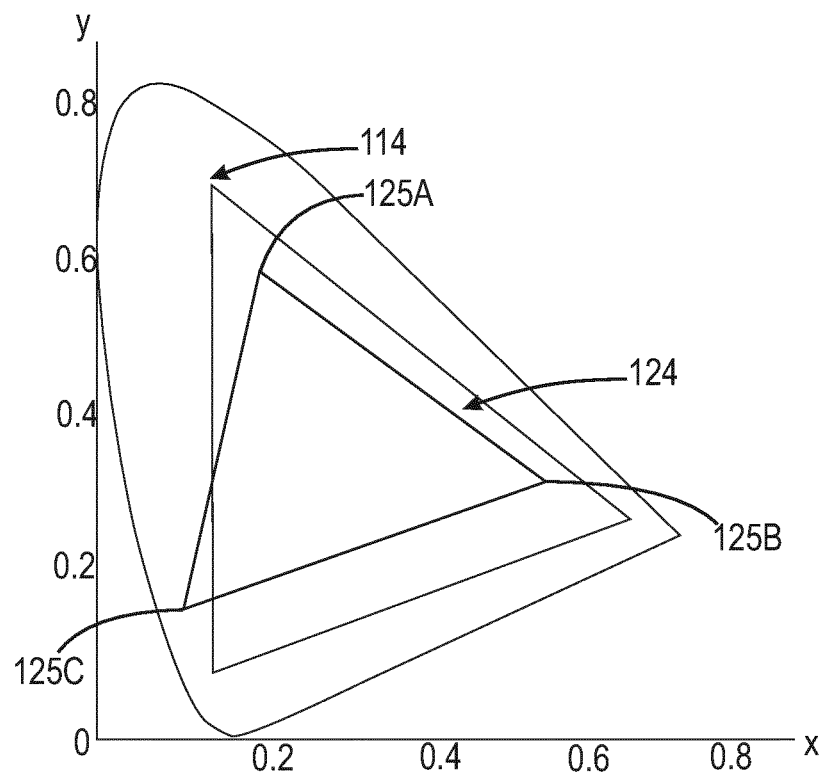
FIG. 4A illustrates another CIE chromaticity diagram including another unique lighting fixture gamut and another global common gamut that is not entirely within the lighting fixture gamut according to the present disclosure.
Figure 5:
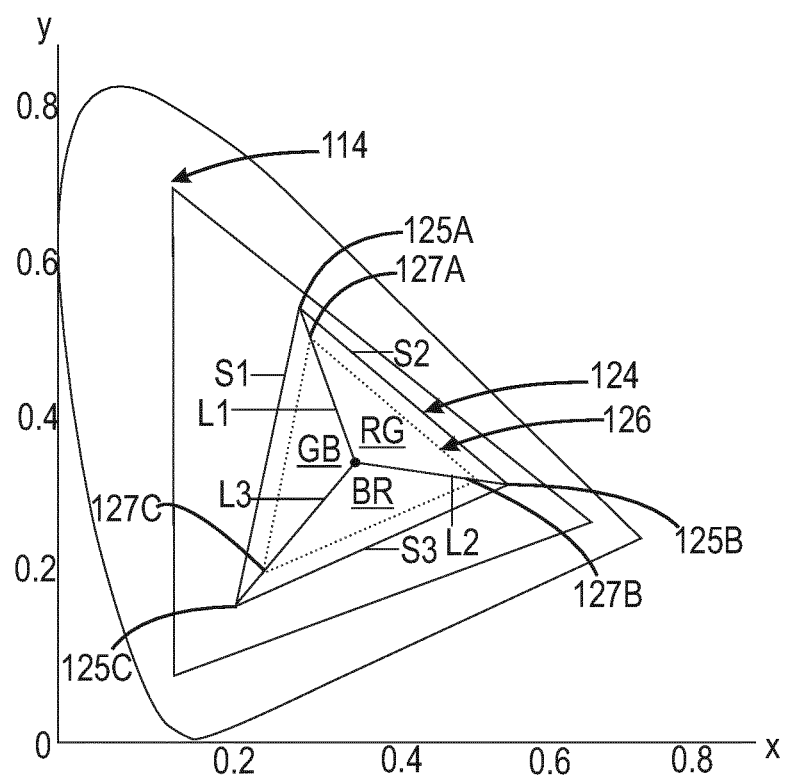
FIG. 5 illustrates the CIE chromaticity diagram of FIG. 4 including an inner region used to target white points accurately according to the present disclosure.

In order to generate variable color light or variable color temperature white light consistently and predictably amongst multiple lighting units, the light sources of the multiple lighting units can be controlled with reference to a global common gamut 124 and an inner region 126 as shown in FIGS. 4, 4A, and 5. Global common gamut 124 can include all of the color points in a color space that are common to two or more lighting units. As shown in FIG. 4, global common gamut 124 can be completely enclosed within each fixture gamut within a lighting system installation. As shown in FIG. 4A, global common gamut 124 can alternatively not be completely enclosed within each fixture gamut within a lighting system installation. In FIG. 4A, although vertices 125A and 125B are inward of gamut 114, vertex 125C is outward of gamut 114. Global common gamut 124 can be generated in any suitable way. One example method of generating the global common gamut 124 involves determining a gamut that falls within each fixture gamut within a lighting system installation whether the gamut is a three-sided polygon, a four-sided polygon or some other shape. For purposes of explaining the present disclosure, we use a triangular global common gamut as shown in FIGS. 4, 4A, and 5 but any shape can be used. Global common gamut 124 is a polygon formed by a plurality of straight sides S1-S3 and a plurality of vertices 125A-C. Each vertex 125A-C of global common gamut 124 is arranged where two adjacent straight sides of the plurality of straight sides meet.

As shown in FIG. 5, a smaller inner region 126 is generated within the global common gamut 124 to target white points accurately. Inner region 126 is defined by the same number of vertices that is used to define the global common gamut and a boundary connecting those vertices. In FIGS. 4, 4A, and 5, global common gamut 124 has three vertices 125A-C and, as shown in FIG. 5, inner region 126 also has three vertices 127A-C. However, it should be appreciated that both could have additional vertices. In example embodiments, each vertex of inner region 126 is collinear with a center of global common gamut 124 and a vertex of global common gamut 124 as shown in FIG. 5. FIG. 5 shows lines L1-L3 figuratively emanating from the center and through the vertices 127A-C of inner region 126 and ending at the vertices 125A-C of global common gamut 124 to illustrate this collinearity.

Figure 5A:
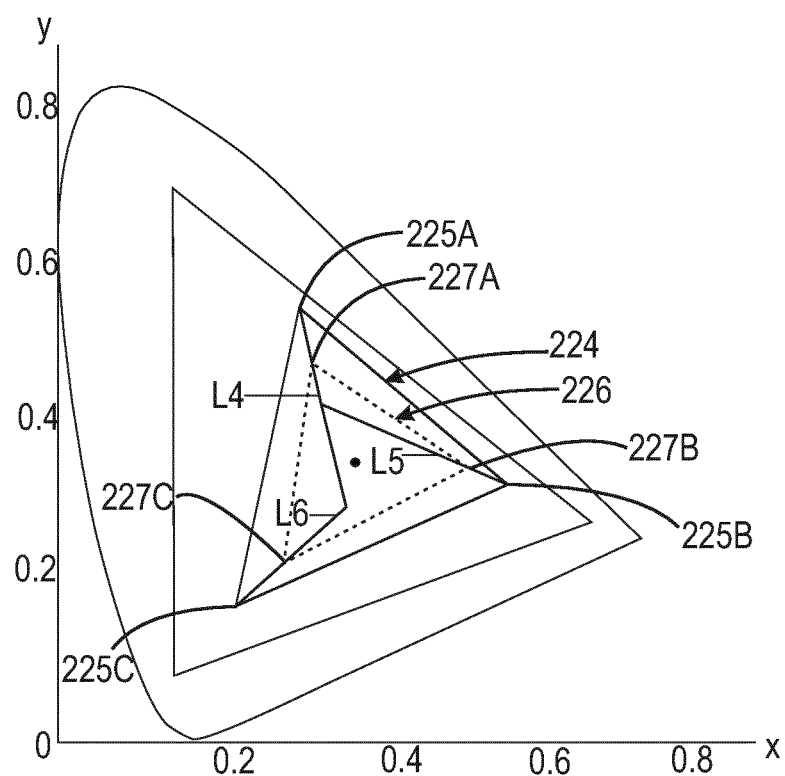
FIG. 5A illustrates another CIE chromaticity diagram including another inner region used to target white points accurately according to the present disclosure.

In other example embodiments, each vertex of inner region 226 need not have the same collinearity as shown in FIG. 5 and as discussed above. For example, in FIG. 5A, inner region 226 is defined by vertices 227A-C and a boundary connecting vertices 227A-C. Inner region 226 has the same number of vertices that is used to define global common gamut 224. However, the vertices of global common gamut 224 and inner region 226 are not collinear with the center of global common gamut 224. Line L4 extends from vertex 225A of global common gamut 224 and through vertex 227A of inner region 226 to the ends of lines L5 and L6. As shown in FIG. 5A, line L5 ends at line L4 at a point that is closer to vertices 227A and 225A than the point at which line L6 ends at line L4. However, in alternate embodiments, line L5 could end at line L4 at a point that is farther from vertices 227A and 225A than the point at which line L6 ends at line L4. Line L5 extends from vertex 225B of global common gamut 224 and through vertex 227B of inner region 226 to a point along line L4. In alternate embodiments, line L5 could end at an end point of line L4. Line L6 extends from vertex 225C of global common gamut 224 and through vertex 227C of inner region 226 to an end point of line L4 however, in alternate embodiments, line L6 could end at a point along line L4. In FIG. 5A, none of lines L4-6 extend through or to the center of global common gamut 224. However, it should be appreciated that any other suitable configuration is contemplated as long as vertices 225A and 227A are connected along line L4, vertices 225B and 227B are connected along line L5, and vertices 225C and 227C are connected along line L6. The portions of lines L4-6 that are between the global common gamut 224 and the inner region 226 define the color space areas discussed below.

Inner region 126 must be fully enveloped by global common gamut 124 but it also should be large enough to enclose all white points that are desired to be targeted accurately. The center of global common gamut 124 is obtained by averaging the x and y chromaticity coordinates of the vertices 125A-C of global common gamut 124. Any selectable target chromaticity within inner region 126 that is received by microprocessor 108 of controller 106 is targeted accurately. In other words, any such selectable target chromaticity that is within inner region 126 is used as-is and the microprocessor 108 as further described below ceases further processing. In example embodiments, lighting commands received by multiple lighting units may be appropriately processed in each lighting unit, based on a predetermined relationship between the lighting commands and the inner region 126.

In order to generate saturated colors as well amongst multiple lighting units, light sources 102A-C can be controlled with reference to the individual fixture gamut(s) as well as global common gamut 124 and inner region 126 as further described below. As used herein, the term "saturated" refers to the amount of saturation in any of the colors that are within the individual fixture gamut(s) 114 and outside inner region 126. These colors that are outside of the inner region 126 are more saturated (i.e., have less white) than the colors that are within the inner region 126. The term "saturated" refers to all of the colors including those that are on the boundary of the individual fixture gamut(s) and those that are inside the boundary but outside the boundary of inner region 126. The term "fully-saturated" is used to refer to those that are on the boundary of the global common gamut 124 or the light fixture gamut(s) 114 in the appropriate context. In other words, a color point specified on the boundary of the global common gamut 124 before the microprocessor 108 performs any modification according to the present disclosure can be considered a "fully-saturated" point. After the microprocessor 108 performs a modification according to the present disclosure, a color point that is on the boundary of the light fixture gamut 114 can be considered a "fully-saturated" point.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, electroluminescent strips, and the like. The term LED refers to light emitting diodes of all types (including semiconductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers).

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

The terms "lighting unit" and "lighting fixture" as used herein refer to an apparatus including one or more light sources of the same or different types. A given lighting fixture may have any suitable mounting arrangement for the light sources, enclosure/housing arrangements and shapes, and/or electrical and mechanical connection configurations. Additionally, a given lighting fixture can also include, be coupled to, and/or packaged with other components (e.g., control circuitry) relating to the operation of the light source(s). An "LED-based lighting fixture" refers to a lighting fixture unit that includes one or more LED-based light sources as discussed above, alone or in combination with other non LED-based light sources.

The term "controller" as used herein refers to various apparatus relating to the operation of one or more light sources. A controller can be implemented with dedicated hardware, using one or more microprocessors that are programmed using software to perform the various functions discussed herein, or as a combination of dedicated hardware to perform some functions and programmed microprocessors and associated circuitry to perform other functions. Examples of controller components that may be employed in various embodiments in the present application include, but are not limited to, microprocessors, application specific integrated circuits (ASICs), and field-programmable gate arrays (FGPAs).

In various embodiments, a controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein.

Figure 6:
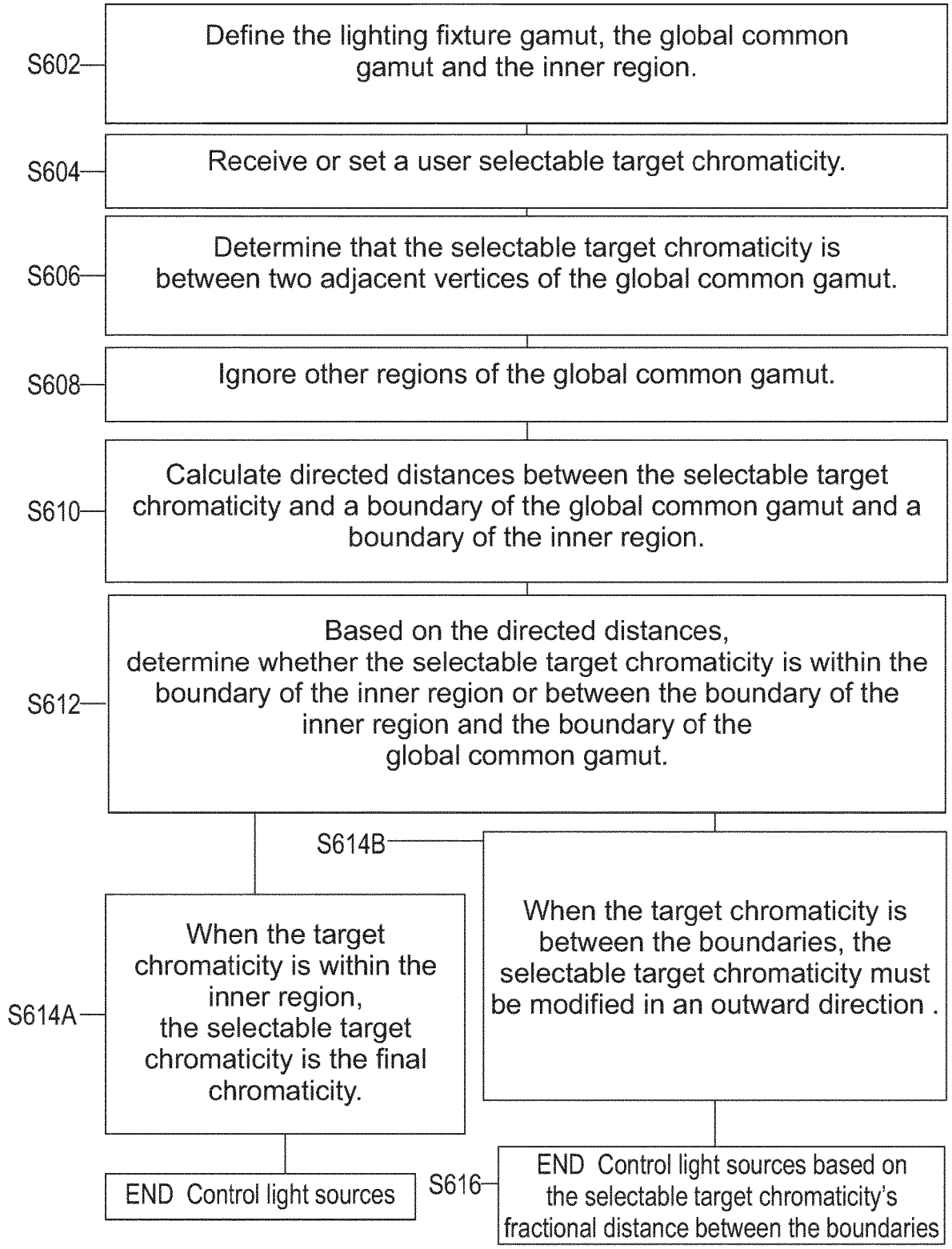
FIG. 6 is a flow chart illustrating a method of controlling an LED-based lighting product to produce accurate white colors and saturated colors according to the present disclosure.

The process used to target colors for accurate white points and saturated colors with color lighting system 100 will now be described with reference to FIG. 6. It is to be understood that various embodiments may not include each of the steps described with reference to FIG. 6 and the order of the steps is not limiting. That is, in other embodiments, the process may be performed in an order different than that described without departing from the scope of this disclosure.

Before the controller 106 of the color light system 100 can determine whether to output one or more control signals to drive light sources 102A-C via the light source interface 104, the lighting fixture gamut 114, the global common gamut 124 and the inner region 126 must be defined at step S602.

The at least one lighting fixture gamut 114 can be predefined and preprogrammed by the manufacturer of the lighting fixture and stored in memory 110. Alternatively, the lighting fixture gamut can be calculated using any suitable tool to measure the chromaticity of the light sources of the lighting fixture and stored in memory 110. For example, the spectral power distribution of the light sources can be measured and mapped to a color space, such as the CIE chromaticity diagram. Such data can then be stored in memory 110. In some embodiments, the fixture gamut depends on temperature, so it can be calculated and re-calculated as needed.

The global common gamut 124 for a lighting fixture or a system including a plurality of lighting fixtures can also be predefined and preprogrammed by the manufacturer and stored in memory 110. Alternatively, a professional lighting installer or another user can define a gamut that contains the color points in common with all of the lighting fixtures in a system and store it in memory 110. In example embodiments, a global common gamut can contain most but not all color points in common with all of the lighting fixtures in a system. In a particular case where the global common gamut is not fully contained within a light fixture's gamut, any suitable region mapping can be used to modify color points selected in the global common gamut and outside of the light fixture gamut. In other embodiments, a computer program product can be configured to determine a gamut that contains the color points in common with all or most of the lighting fixtures in a system and store it in memory 110. The center of the global common gamut 124 can be defined as well either by the manufacturer or otherwise as described herein and stored in memory 110.

The inner region 126 of the global common gamut 124 can be predefined and preprogrammed by the manufacturer and stored in memory 110. Otherwise, a professional lighting installer or some other user can define the inner region 126 to customize all the white points that are to be accurately targeted. In other embodiments, a computer program product can be configured to determine inner region 126 based on input(s) of all the white points that are to be accurately targeted and stored in memory 110.

Once the lighting fixture gamut 114, the global common gamut 124 and the inner region 126 are defined, a user selectable target chromaticity can be received or set via external interface 112 at step S604. For example, a user can input via the external interface a target chromaticity in the form of red, green, and blue values as numbers varying from 0 to 255 and such values can be processed according to the DMX-512 protocol (in which eight bits are employed to specify the relative strength of each light source; i.e., 24-bit color control). It should be appreciated, however, that virtually any scale may be employed, in any of a variety of lighting command formats, to specify the relative amounts of the respective sources in a given lighting unit to generate a resulting color or color temperature of light. In example embodiments, the DMX values can be weighted values and may employ a dimming curve.

After the user selectable target chromaticity is received by the microprocessor 108, it is determined that the target chromaticity is between two adjacent vertices of global common gamut 124 at step S606. For example, with reference to FIGS. 5 and 7, the microprocessor 108 can divide global common gamut 124 into three regions based on the number of vertices of the global common gamut and determine in which region the target chromaticity is located. Since global common gamut 124 has red, green, and blue points, global common gamut 124 can be divided into regions RG, GB, and BR as shown in FIG. 5 using lines L1-L3 discussed above. A user selectable target chromaticity can be in any of the three regions. In order to determine in which region a target chromaticity is located, an equation for each of lines L1-L3 can be derived and a directed distance can be calculated between the target chromaticity and each line to determine whether the target chromaticity is above or below each line (or outward or inward of each line relative to a center point). Since these lines do not change, they can be calculated when global common gamut 124 is defined and stored in memory 110. The following equations can be used to define each line:

$$y_R = a_R x + b_R$$
$$y_G = a_G x + b_G$$
$$y_B = a_B x + b_B$$

where a represents slope and b represents the y-intercept. With reference to FIG. 5, equation (1) above defines line L2, equation (2) above defines line L1, and equation (3) above defines the line L3.

Figure 7:
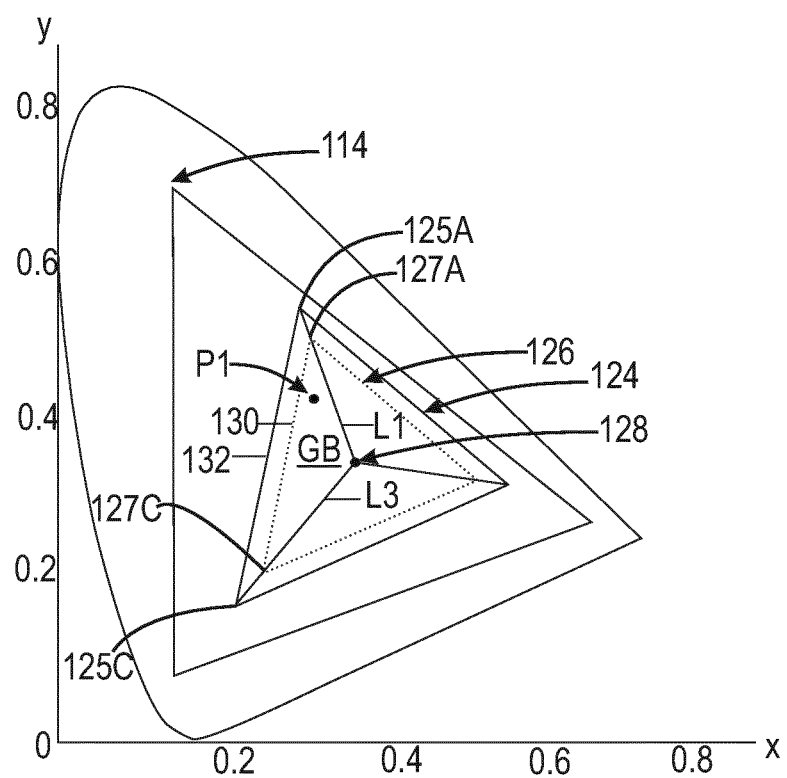
FIG. 7 illustrates an example CIE chromaticity diagram showing a target chromaticity point within the inner region according to the present disclosure.

Once the microprocessor 108 determines in which region the target chromaticity is located, the microprocessor 108 can ignore the other regions at step S608. With reference to FIG. 7, in an example embodiment target chromaticity point P1 is in the GB region, between the center-green line (e.g., line L1) and the center-blue line (e.g., line L3) and microprocessor 108 focuses on this region. Microprocessor 108 can then define transition boundary 130 of the inner region 126 between vertices 127A and 127C and boundary 132 of the global common gamut 124 between vertices 125A and 125C using equation y=ar+b.

Microprocessor 108 can then calculate directed distances between the target chromaticity point P1 and each of the boundaries 130 and 132 at step S610. For example, microprocessor 108 can calculate $d_{P\text{-}b1}$ representing the distance between the target chromaticity point P1 and boundary 130 (or b1) and $d_{P\text{-}b2}$ representing the distance between the target chromaticity point P1 and boundary 132 (or b2). These distances can be defined as the shortest distances between the target chromaticity point and the respective boundary. Although the boundaries 130 and 132 are not necessarily parallel, in all practical applications they will be nearly parallel. The use of the shortest distance is a way of treating them as equally valid slopes that may or may not be parallel. These boundaries 130 and 132 would not be vertical in practical implementations. The following equations can be used to calculate the directed distances as discussed above:

$$K = \pm\sqrt{1 + a^2}$$
$$d_{P\text{-}b1} = \frac{y_P - ax_P - b}{K}$$
$$d_{P\text{-}b2} = \frac{y_P - ax_P - b}{K}$$

Since K is a function of a (e.g., a cosine function) it should be appreciated that there are six possible values of K, namely, two for boundaries 130 and 132 as discussed herein, two more for the boundaries of the global common gamut and the inner region between vertices 125A and 127A and vertices 125B and 127B (e.g., within region RG), and two more for the boundaries of the global common gamut and the inner region between vertices 125B and 127B and vertices 125C and 127C (e.g., within region BR). Thus, the calculations for $d_{P\text{-}b1}$ and $d_{P\text{-}b2}$ use two different values of K, namely, one for b1 and another for b2. Since K is a scale factor that is known in advance and can be precalculated as a factory setting, it can be stored in memory 110. It should also be appreciated that the "±" used in the equation for K is there to signify that one should choose the sign that represents the desired direction so that a positive directed distance is oriented away/further from the center 128 and a negative directed distance is oriented toward/closer to the center 128. For example, for bluish-green colors or yellow colors, a positive distance directs outward from the center, but for purple colors a positive distance directs inward toward the center. The proper sign should be used such that a positive directed distance is oriented away/further from the center 128.

It should be appreciated that the directed distances can also be determined in other ways. For example, a line can be drawn joining the center of the global common gamut as discussed herein to the target chromaticity point P1. The line from the center to point P1 can be projected onto the global common gamut. The distances $d_{P\text{-}b1}$ and $d_{P\text{-}b2}$ can be calculated using the single projection line. This can be particularly well suited for when the global common gamut and the inner region are parallel or substantially parallel.

Based on the directed distances, microprocessor 108 can determine whether the target chromaticity point P1 is within transition boundary 130 of inner region 126 or between transition boundary 130 of inner region 126 and boundary 132 of global common gamut 124 at step S612. If the target chromaticity point P1 is inside transition boundary 130 of inner region 126 (as shown in FIG. 7) then the user has selected a white point that can be accurately targeted. In that case, the directed distances $d_{P\text{-}b1}$ and $d_{P\text{-}b2}$ would both be negative since the target chromaticity point P1 is inward of both b1 and b2 relative to the center. In other words, when the directed distances $d_{P\text{-}b1}$ and $d_{P\text{-}b2}$ are both negative, both boundaries b1 and b2 are outward of the target chromaticity point P1 relative to the center of the global common gamut. When the directed distances are both negative, microprocessor 108 uses the input values as-is for outputting control signals to light sources 102A-C at step S614A. In other words, the final target chromaticity is the requested target chromaticity. No further processing is necessary when the target chromaticity point is inside transition boundary 130 of inner region 126. As shown in FIG. 7, the input DMX values for R, G, and B using global common gamut 124 represent point P1 which is inside both global common gamut 124 and inner region 126. Thus, the color lighting system 100 is optimized for accuracy using the control parameters of inner region 124.

Figure 8:
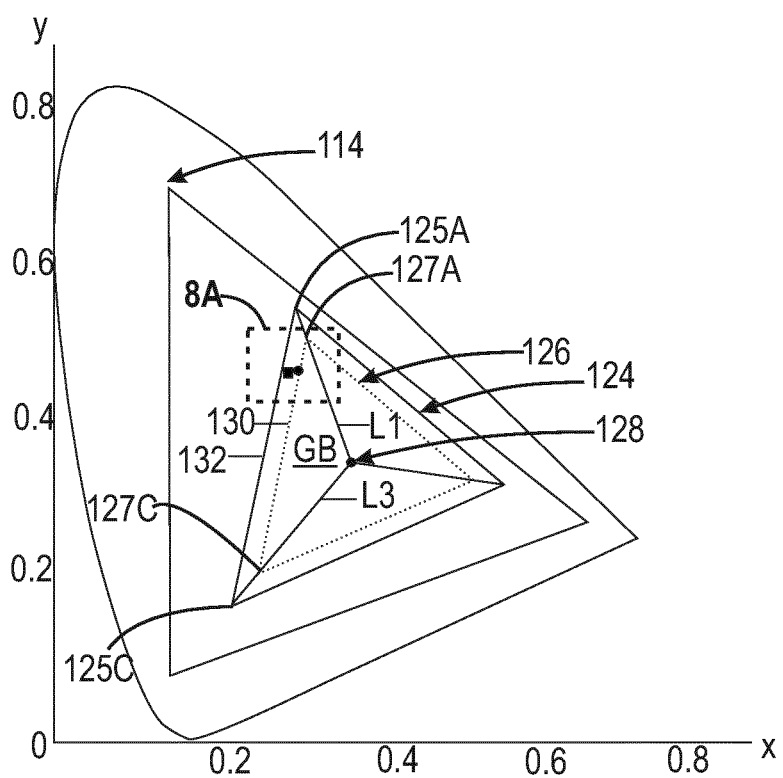
FIG. 8 illustrates an example CIE chromaticity diagram showing a target chromaticity point within the global common gamut and outside the inner region according to the present disclosure.
Figure 8A:
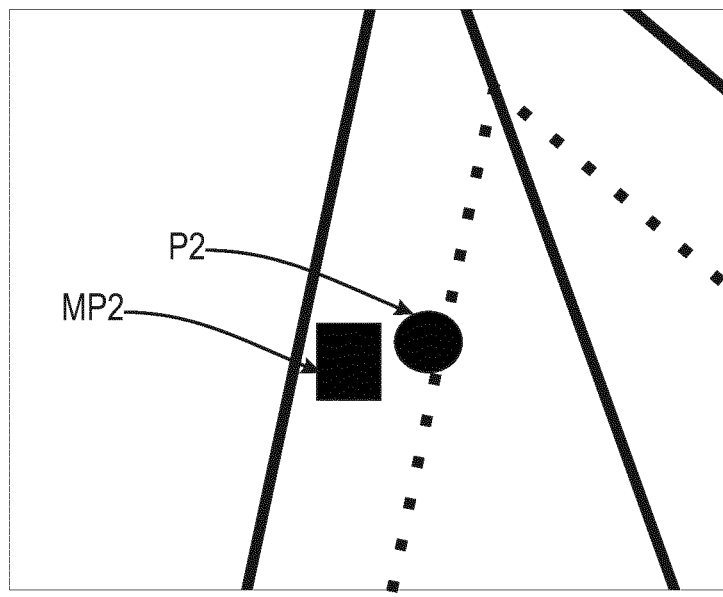
FIG. 8A illustrates an enlarged view taken generally about area 8A in FIG. 8.

On the other hand, if the target chromaticity point is between transition boundary 130 of inner region 126 and boundary 132 of global common gamut 124, microprocessor 108 can output modified control signals to light sources 102A-C as described further below. As shown in FIGS. 8 and 8A, the input DMX values for R, G, and B using global common gamut 124 can represent point P2 which is between transition boundary 130 of inner region 126 and boundary 132 of global common gamut 124. Since point P2 is outside of inner region 126, the user is expressing an intent for a more saturated color and microprocessor 108 can stretch the point to a modified target chromaticity. Based on the values of point P2 represented in FIGS. 8 and 8A, directed distance $d_{P-b_1}$ would be positive and directed distance $d_{P-b_2}$ would be negative. This is because point P2 is outward of (or above) transition boundary 130 but inward of (or below) boundary 132 with reference to the center point 128. In other words, the target point P2 is above transition boundary 130 and below boundary 132. When at least one directed distance is positive, microprocessor 108 determines that the input values must be modified in an outward direction toward the boundary 132 of global common gamut 124 and the lighting fixture gamut 114 at step S614B. An input value that is modified in an outward direction specifies a more saturated color than initially requested.

In order to determine how far to stretch the target chromaticity point in an outward direction, microprocessor 108 can calculate the point's fractional distance between the boundaries 130 and 132, represented by ratios R and 1-R at step S616. The ratio R can be expressed as follows using the absolute values of the directed distances:

$$R = \frac{|d_{P-b_2}|}{|d_{P-b_1}| + |d_{P-b_2}|}$$

The ratios R and 1-R when added together equal 1 or 100%. The ratio R expresses whether the target chromaticity point is closer to the transition boundary 130 of the inner region 126 or boundary 132 of global common gamut 124. When the point is closer to the transition boundary 130, the ratio R is greater because the distance between the point and boundary 132 is greater than the distance between the point and the transition boundary 130. When the point is closer to boundary 132, the ratio R is smaller because the distance between the point and boundary 132 is smaller than the distance between the point and transition boundary 130. When the point is closer to transition boundary 130 of inner region 126, the weighted average will favor the chromaticity being near the user-targeted color point. In contrast, when the point is closer to boundary 132 of global common gamut 124, the weighted average will disfavor the chromaticity being near the user-targeted color point. As shown in FIGS. 8 and 8A, based on the position of point P2, microprocessor 108 stretches the point to a modified target chromaticity MP2. In FIGS. 8 and 8A, modified target chromaticity MP2 is adjacent to and slightly outward of target chromaticity point P2. Modified target chromaticity MP2 in FIGS. 8 and 8A is still within global common gamut 124.

Figure 9:
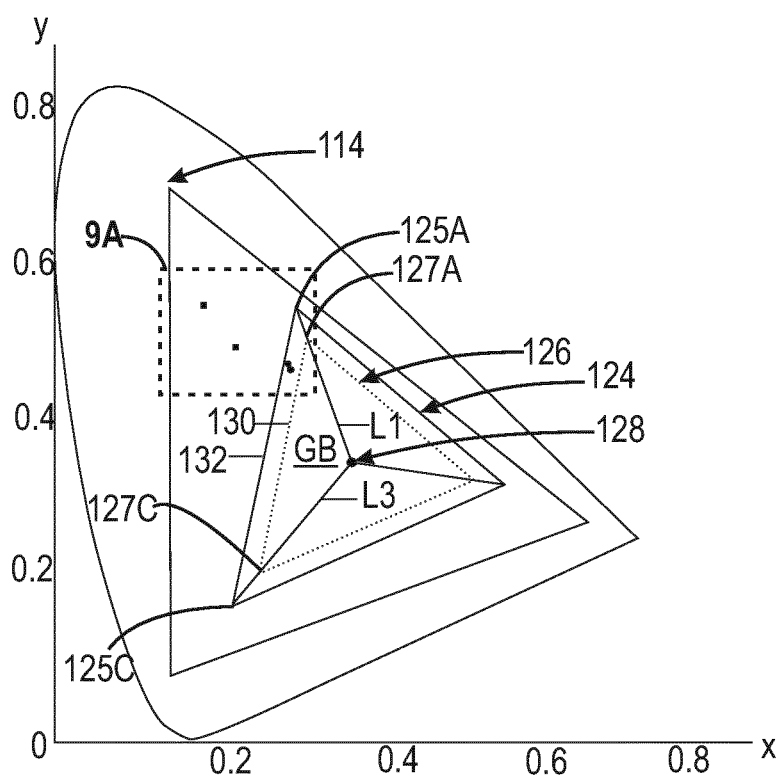
FIG. 9 illustrates another example CIE chromaticity diagram showing additional target chromaticity points within the global common gamut and outside the inner region according to the present disclosure.
Figure 9A:
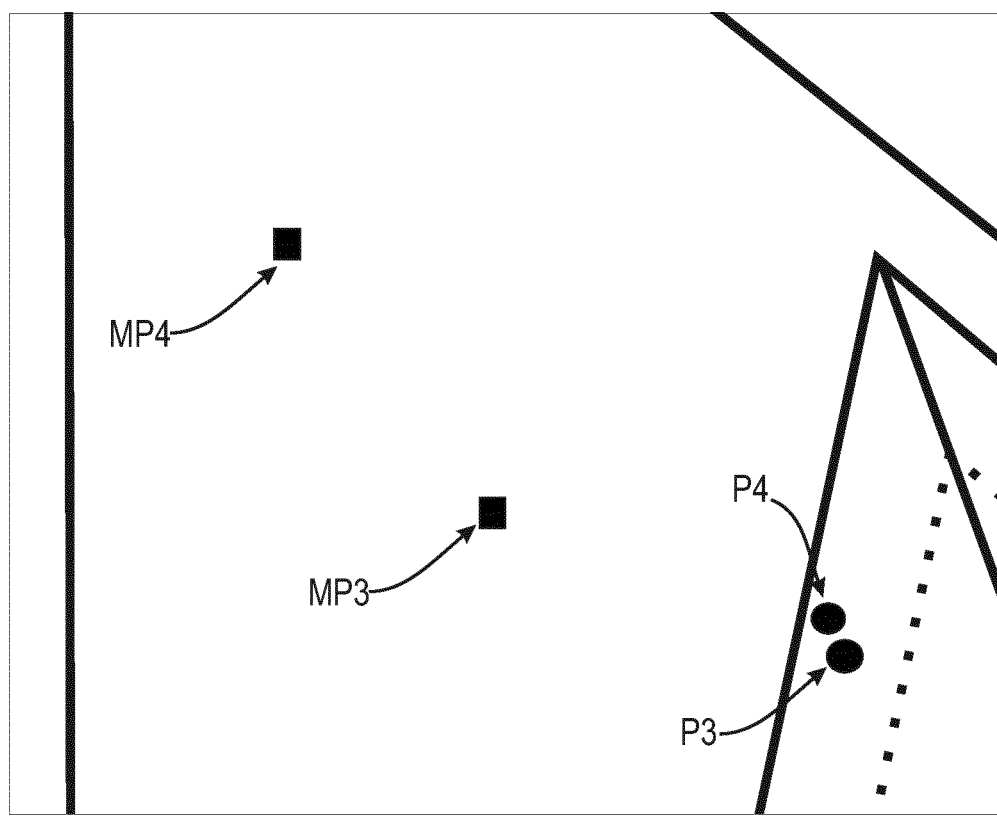
FIG. 9A illustrates an enlarged view taken generally about area 9A in FIG. 9.

As shown in FIGS. 9 and 9A, based on the position of point P3, microprocessor 108 stretches the point to a modified target chromaticity MP3. Modified target chromaticity MP3 in FIG. 9 is no longer within global common gamut 124. Instead, modified target chromaticity MP3 is stretched outward beyond global common gamut 124 and into parts of lighting fixture gamut 114 that do not overlap with global common gamut 124. As shown in FIGS. 9 and 9A, based on the position of point P4, microprocessor 108 stretches point P4 to a modified target chromaticity MP4 that is also outward of global common gamut 124 and in lighting fixture gamut 114. FIGS. 9 and 9A show how a slight difference in saturation in user selected target points (P3 vs. P4) can yield greatly different saturations in modified chromaticity points (MP3 vs. MP4). In other words, since P4 is slightly more saturated than P3, modified point MP4 is greatly more saturated than modified point MP3 due to the stretching performed by microprocessor 108 as discussed herein. In example embodiments, the modified target chromaticity can be determined from the input dimming ratios as if they applied to the light fixture's gamut.

If the input values for R, G, and B include one or more values that are equal to zero, that causes the ratio R discussed above to be zero and microprocessor 108 targets a fully-saturated color that is limited only by the optical capability of the LEDs of the lighting unit or fixture. On the other hand, if the input values represent a less saturated color, the ratio R is larger and microprocessor blends between the requested color and the most saturated possible color.

In example embodiments, as the user changes DMX input values, the fixture gradually responds to those changes by blending between accurate white/pastel colors and saturated colors.

Figure 9B:
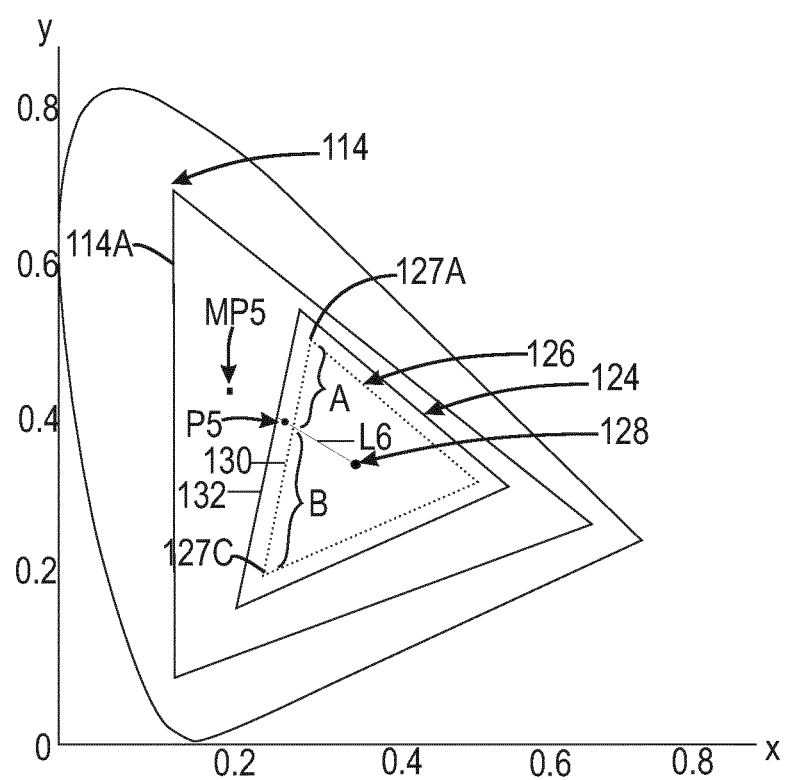
FIG. 9B illustrates another example method of stretching a target point according to the present disclosure.

In example embodiments, microprocessor 108 can determine how far to stretch the target chromaticity point in an outward direction alternatively. Instead of using the point's fractional distance between the boundaries 130 and 132 as discussed above, as shown in FIG. 9B a line L6 can be drawn connecting the center 128 of the global common gamut to the target point P5 and the line can be projected onto the global common gamut 124. As shown in FIG. 9B, the target point P5 can represent a weighted average of distances A and B and distances $d_{P-b_1}$ and $d_{P-b_2}$. Distance A is measured between vertex 127A of inner region 126 and the point where line L6 intersects transition boundary 130 of inner region 126. Distance B is measured between vertex 127C of inner region 126 and the point where line L6 intersects transition boundary 130 of inner region 126. Microprocessor 108 can calculate the stretched target chromaticity (e.g., MP5) as the same ratio A and B but applied to transition boundary 130 and fixture gamut line 114A. In other words, the target point P5 is a weighted average of the endpoints of transition boundary 130 and the endpoints of boundary 132. The stretched target uses the same weighted average, but applied to the transition boundary 130 and the boundary 114A of the fixture gamut.

Figure 10:
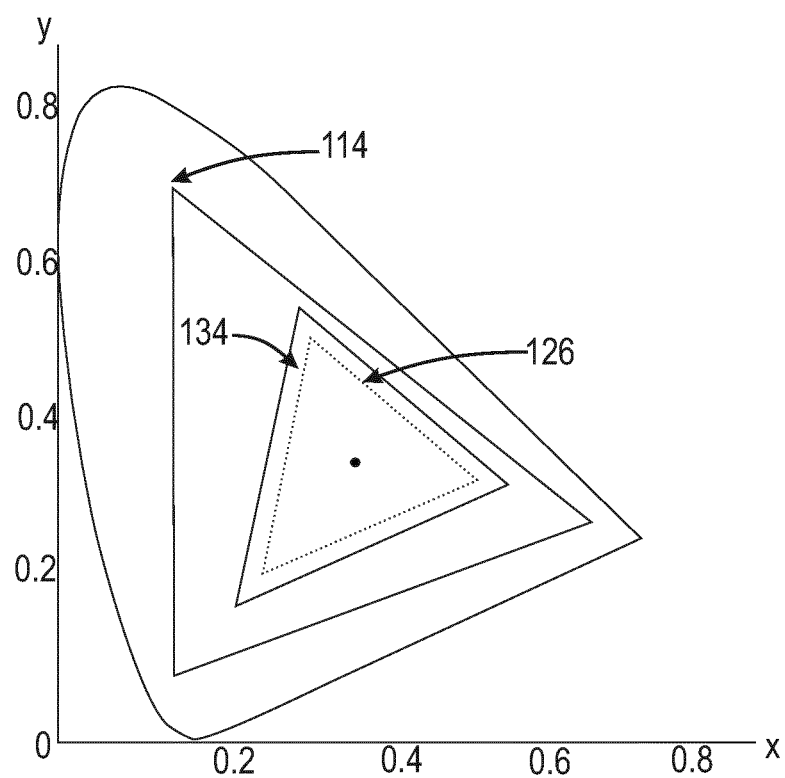
FIG. 10 illustrates an example CIE chromaticity diagram showing an exemplary lighting fixture gamut, an exemplary global common gamut and an exemplary non-overlapping inner region according to the present disclosure.

In example embodiments, the process of stretching the target chromaticity point in an outward direction involves stretching a color space area 134 in the global common gamut 126. For example, FIG. 10 shows inner region 126 and the area 134 between inner region 126 and the exterior of global common gamut 124. As discussed above, since inner region 26 remains constant at all times, all fixtures can target points requested in area 126 accurately. Points that are requested between the inner region 126 and the exterior of global common gamut 124 can be stretched as discussed above to produce saturated colors. In example embodiments, color space area 134 or parts thereof can be stretched as well.

Figure 11:
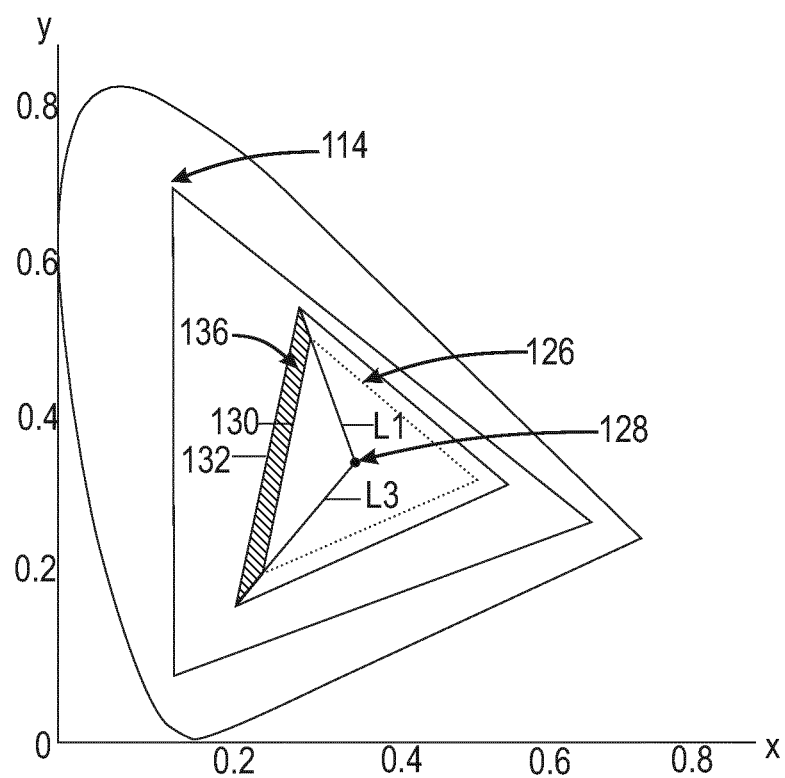
FIG. 11 illustrates the example CIE chromaticity diagram of FIG. 10 showing a first color space area according to the present disclosure.
Figure 12:
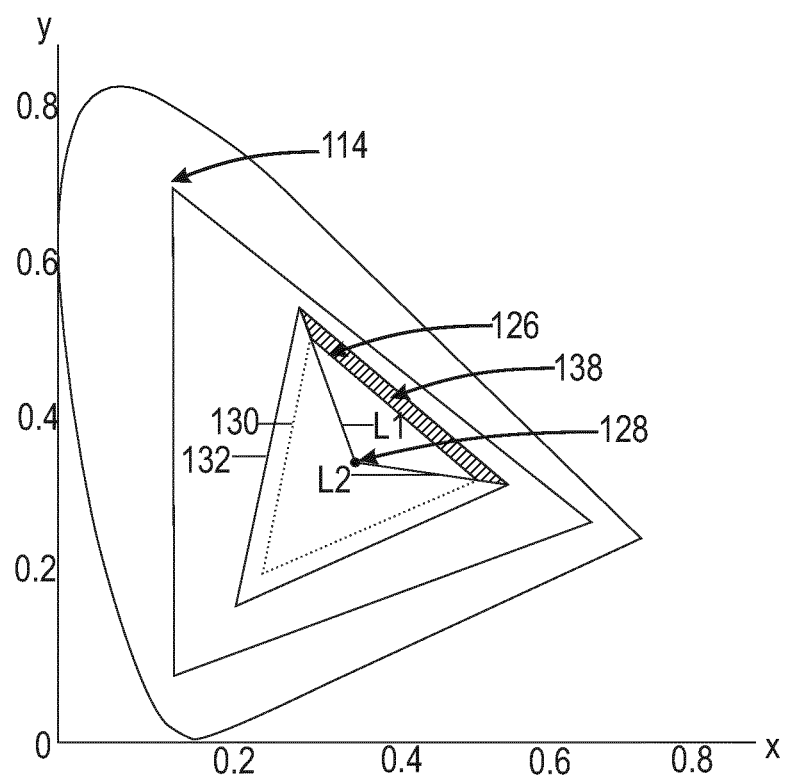
FIG. 12 illustrates the example CIE chromaticity diagram of FIG. 10 showing a second color space area according to the present disclosure.
Figure 13:
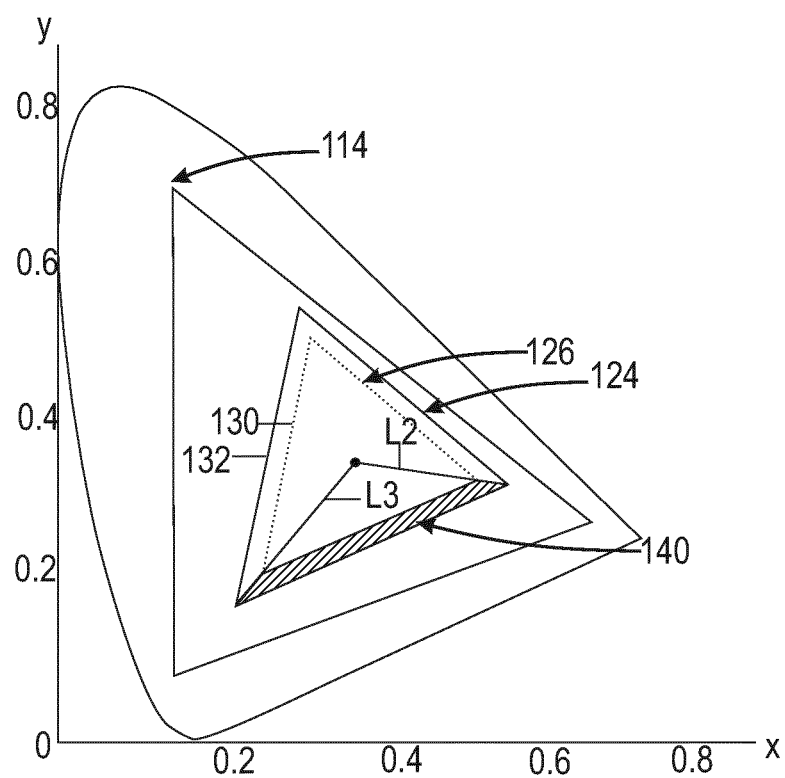
FIG. 13 illustrates the example CIE chromaticity diagram of FIG. 10 showing a third color space area according to the present disclosure.

As shown in FIGS. 11-13, area 134 can be divided into subareas 136, 138, and 140. In example embodiments, microprocessor 108 can divide area 134 into three subareas based on the number of vertices of the global common gamut 124 and the inner region 126. In examples, this subdivision can be carried out after or at the same time microprocessor 108 determines in which region the target chromaticity is located as discussed above. For example, subarea 136 is the part of global common gamut 124 that does not overlap with inner region 126 and is situated between lines L1 and L3 in FIG. 11. Similarly, subarea 138 is the part of global common gamut 124 that does not overlap with inner region 126 and is situated between lines L1 and L2 in FIG. 12. Subarea 140 is also part of global common gamut 124 that does not overlap with inner region 126 and is situated between lines L2 and L3 in FIG. 13.

Figure 14:
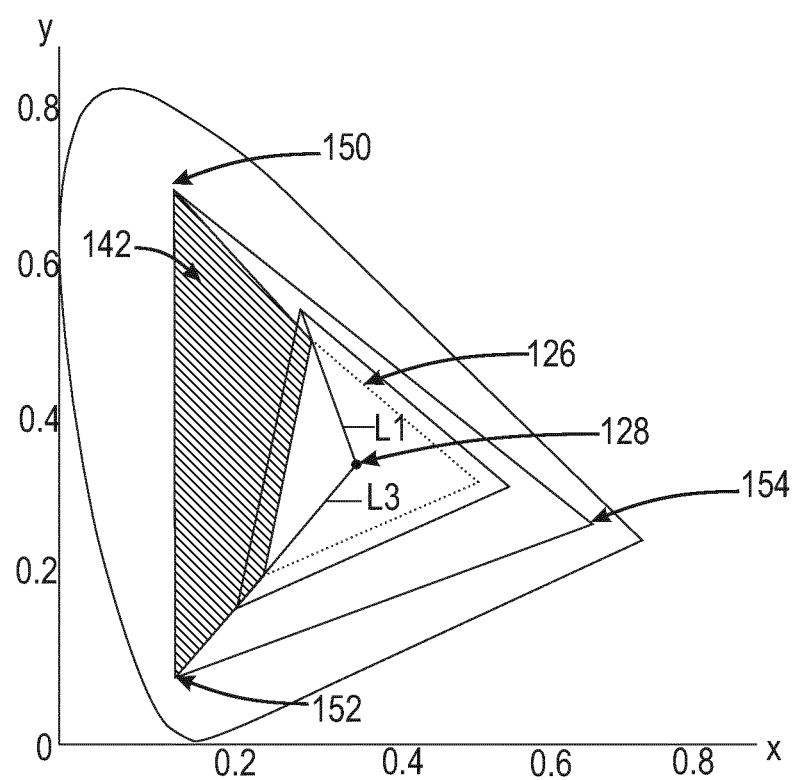
FIG. 14 illustrates an example CIE chromaticity diagram showing a first modified color space area based on the first color space area shown in FIG. 11 according to the present disclosure.
Figure 15:
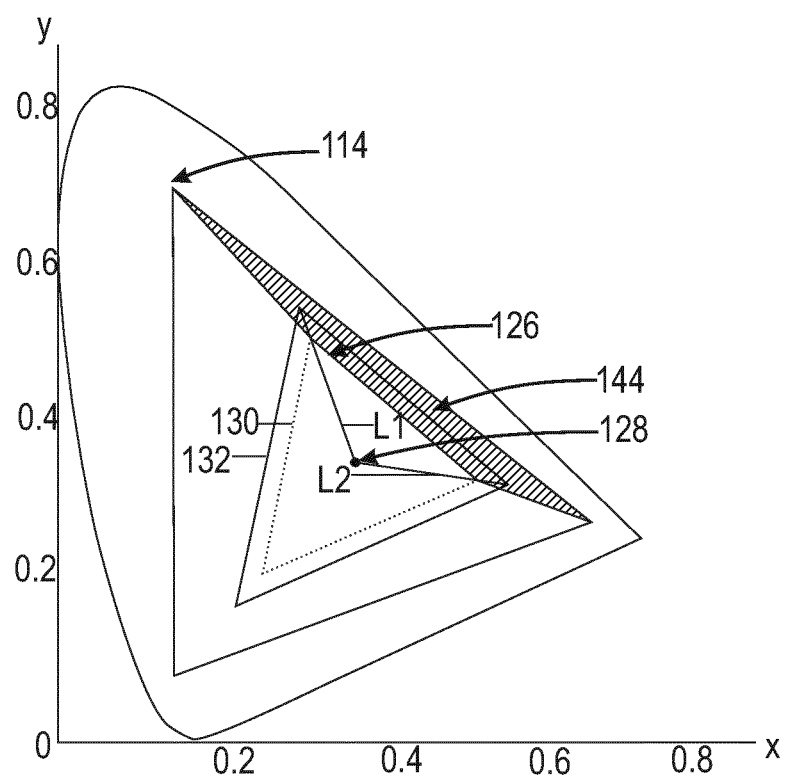
FIG. 15 illustrates an example CIE chromaticity diagram showing a second modified color space area based on the second color space area shown in FIG. 12 according to the present disclosure.
Figure 16:
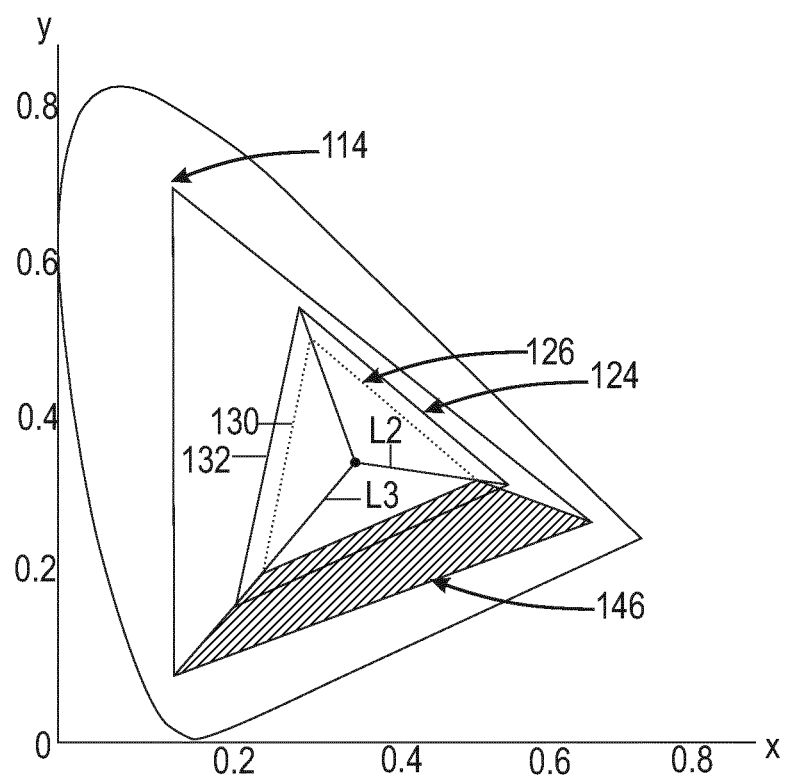
FIG. 16 illustrates an example CIE chromaticity diagram showing a third modified color space area based on the third color space area shown in FIG. 13 according to the present disclosure.

With reference to FIGS. 14-16, subareas 136, 138, and 140 can be modified to subareas 142, 144, and 146, respectively. For example, in FIG. 14 subarea 136 which is otherwise termed a color space area in the present disclosure can be modified such that the outer boundary of subarea 136 is limited only by the optical capability of the LEDs of the lighting unit or fixture. Subarea 136 can be modified to subarea or color space area 142 when a target chromaticity point is determined to be within color space area 136. Referring back to FIG. 11, color space area 136 is defined by transition boundary 130 of inner region 126, boundary 132 of global common gamut 126 and parts of lines L1 and L3 extending between center 128 and vertices 125A and 125C of global common gamut 126. Color space area 142 in FIG. 14 is defined by transition boundary 130 of inner region 126 and two adjacent vertices 150 and 152 of a plurality of vertices 150, 152, 154 of lighting fixture gamut 114.

Figure 17:
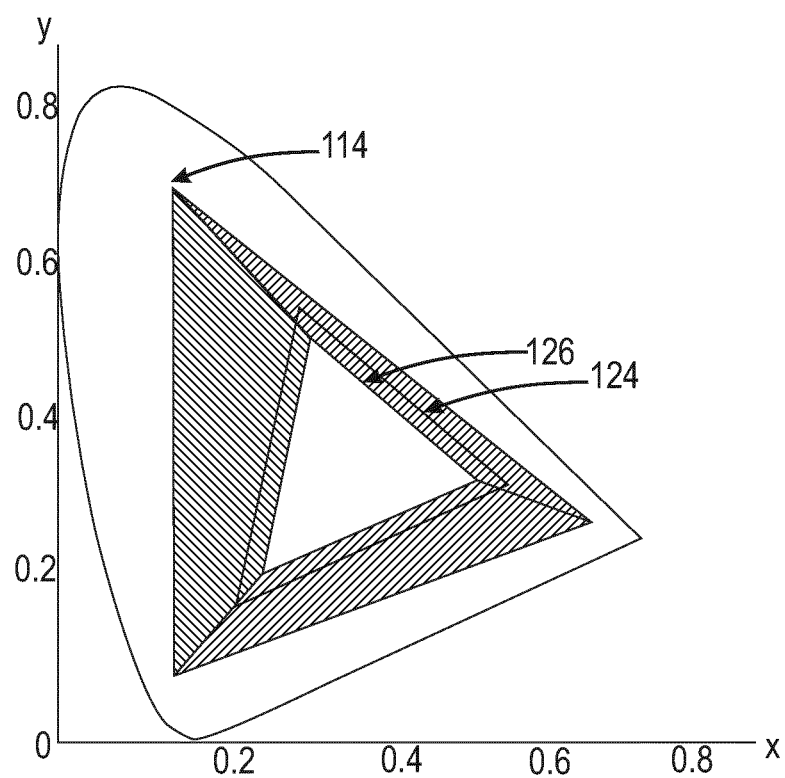
FIG. 17 illustrates an example CIE chromaticity diagram showing a central portion of a lighting fixture gamut optimized for color accuracy and an outer portion of the lighting fixture gamut optimized for saturation according to the present disclosure.

Similarly, color space areas 138 and 140 can be modified such that their outer boundaries are limited only by the optical capability of the LEDs of the lighting unit or fixture when appropriate. For example, color space area 138 in FIG. 12 can become color space area 144 in FIG. 15 when the target chromaticity point is determined to be within color space area 138 and color space area 140 in FIG. 13 can become color space area 146 in FIG. 16 when the target chromaticity point is determined to be within color space area 140. FIG. 17 shows the modified color space areas 142, 144, and 146, in combination, relative to the inner region 126.

Advantageously, the systems and methods described herein enable a user to easily select accurate white/pastel color points and saturated colors within a LED-based light system without changing settings or reconfiguring the light installation.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A method of driving a plurality of LED-based light sources at a selectable target chromaticity in a color space, the method comprising:

receiving or setting the selectable target chromaticity within a global common gamut of the color space, wherein the global color gamut includes one or more color points in the color space that is common to two or more of the plurality of LED-based light sources;

determining that the selectable target chromaticity is between two adjacent vertices of a first plurality of vertices of the global common gamut;

defining, with a transition boundary, an inner region within the global common gamut;

calculating first directed distance ($d_{P-b1}$) between the selectable target chromaticity and the transition boundary of the inner region and a second directed distance ($d_{P-b2}$) between the selectable target chromaticity and a straight side of the global common gamut between the two adjacent vertices; and modifying the selectable target chromaticity to a modified target chromaticity within a light fixture gamut based at least in part on the calculated first and second directed distances, the modification being in an outward direction toward a boundary of the global common gamut and the lighting fixture gamut, the light fixture gamut including color points generated by at least one of the plurality of LED-based light sources; or generating an activation signal for driving the plurality of LED-based light sources based on the selectable target chromaticity, the selectable target chromaticity being within the inner region.

2. The method of claim 1, further comprising:

calculating the light fixture gamut where the light fixture gamut at least partially encloses the global common gamut, wherein the step of calculating the light fixture gamut comprises determining or receiving colorimetric data indicative of colorimetric properties of light emitted by the plurality of LED-based light sources, wherein the colorimetric properties define the light fixture gamut.

3. The method of claim 2, wherein the light fixture gamut fully encloses the global common gamut.

4. The method of claim 1, wherein the step of defining the inner region comprises:

defining a global gamut center by calculating an average of chromaticity values for color points at the first plurality of vertices of the global common gamut;

extending a line between the global gamut center and each of the first plurality of vertices of the global common gamut; and positioning a second plurality of vertices such that each vertex of the second plurality of vertices intersects one of the lines extending between the global gamut center and each of the first plurality of vertices and the transition boundary connects the second plurality of vertices.

5. The method of claim 1, wherein the step of defining the inner region comprises:
defining a global gamut center by calculating an average of chromaticity values for color points at the first plurality of vertices of the global common gamut;
positioning a second plurality of vertices such that each vertex of the second plurality of vertices is between the global gamut center and a respective vertex of the first plurality of vertices; and
connecting the transition boundary between the second plurality of vertices;
wherein the first and second plurality of vertices are not collinear with the global gamut center.

6. The method of claim 1, wherein the step of determining that the selectable target chromaticity is between two adjacent vertices of the first plurality of vertices of the global common gamut comprises:
defining a global gamut center by calculating an average of chromaticity values for color points at the first plurality of vertices of the global common gamut;
extending a line between the global gamut center and each of the first plurality of vertices of the global common gamut; and
determining that the selectable target chromaticity is between two adjacent lines extending between the global gamut center and the first plurality of vertices of the global common gamut by calculating third and fourth directed distances between the selectable target chromaticity and the lines extending between the global gamut center and the two adjacent vertices of the of the global common gamut.

7. The method of claim 1, wherein the step of calculating the first and second directed distances comprises:
defining a global gamut center by calculating an average of chromaticity values for color points at the first plurality of vertices of the global common gamut;
extending a line between the global gamut center and the selectable target chromaticity;
projecting the line onto the global common gamut; and
calculating the first directed distance between the selectable target chromaticity and a first point where the line intersects the transition boundary of the inner region and the second directed distance between the selectable target chromaticity and a second point where the line intersects the straight side of the global common gamut between the two adjacent vertices.

8. The method of claim 1, further comprising determining to modify the selectable target chromaticity when the selectable target chromaticity is outward of the inner region.

9. The method of claim 1, further comprising modifying the selectable target chromaticity to the modified target chromaticity within the light fixture gamut and outside the global common gamut based at least in part on a relationship between the calculated first and second directed distances.

10. The method of claim 1, further comprising:
calculating the light fixture gamut where the light fixture gamut at least partially encloses the global common gamut and the light fixture gamut comprises a third plurality of vertices; and
modifying a first color space area to a second color space area, where the first color space area is defined by the straight side of the global common gamut, the transition boundary of the inner region and lines extending between endpoints of the straight side and the transition boundary and the second color space area is defined by the transition boundary of the inner region and two adjacent vertices of the third plurality of vertices of the light fixture gamut.

11. A system, comprising:
a plurality of LED-based light sources configured to generate light defined by a light fixture gamut within a color space; and
a controller configured to:
receive or set a selectable target chromaticity within a global common gamut; of the color space, wherein the global color gamut includes one or more color points in the color space that is common to two or more of the plurality of LED-based light sources;
determine that the selectable target chromaticity is between two adjacent vertices of a first plurality of vertices of the global common gamut;
define, with a transition boundary, an inner region within the global common gamut;
calculate a first directed distance ($d_{P\text{-}b1}$) between the selectable target chromaticity and the transition boundary of the inner region and a second directed distance ($d_{P\text{-}b2}$) between the selectable target chromaticity and a straight side of the global common gamut between the two adjacent vertices; and
modify the selectable target chromaticity to a modified target chromaticity within the light fixture gamut based at least in part on the calculated first and second distances, the modification being in an outward direction toward a boundary of the global common gamut and the lighting fixture gamut, the light fixture gamut including color points generated by at least one of the plurality of LED-based light sources; or
generate an activation signal for driving the plurality of LED-based light sources based on the selectable target chromaticity.

12. The system of claim 11, wherein the controller is further configured to generate an activation signal for driving the plurality of LED-based light sources based on the modified target chromaticity.

13. The system of claim 11, wherein the light fixture gamut at least partially encloses the global common gamut and the light fixture gamut is defined by colorimetric properties of light emitted by the plurality of LED-based light sources.

14. The system of claim 11, wherein the modified target chromaticity is outside the global common gamut.

* * * * *